United States Patent [19]

Puzic et al.

[11] Patent Number: 5,549,744
[45] Date of Patent: Aug. 27, 1996

[54] PAVEMENT BINDER

[75] Inventors: Olga Puzic; Larry J. Evers; Kenneth E. Williamson, all of Sarnia, Canada; Martin L. Gorbaty, Westfield; Nicholas C. Nahas, Chatham, both of N.J.

[73] Assignee: Exxon Research and Engineering Company, Florham Park, N.J.

[21] Appl. No.: 525,898

[22] Filed: Sep. 8, 1995

[51] Int. Cl.$^6$ .......................... C09D 195/00; C08L 95/00
[52] U.S. Cl. .......................... 106/274; 106/284.4; 524/59; 524/68; 524/70; 524/71
[58] Field of Search .................. 106/274, 284.4; 524/59, 68, 70, 71

[56] References Cited

U.S. PATENT DOCUMENTS 5,248,407  9/1993  Bardet et al. ................. 106/274
5,348,994  9/1994  Gorbaty et al. ................ 524/68

Primary Examiner—David Brunsman
Attorney, Agent, or Firm—Linda M. Scuorzo

[57] ABSTRACT

The present invention provides for a method of making storage stable road paving binders by blending a minor amount of a polymer having at least one diene monomer with a major amount of asphalt containing at least 0.3% by weight of total nitrogen at an elevated temperature such that the components are sufficiently fluid to blend; treating the asphalt-polymer blend using not more than 250 meq of a sulfonating agent per 100 g of asphalt-polymer blend to introduce the corresponding acid functionality into the blend; maintaining the sulfonated asphalt-polymer blend at a sufficiently elevated temperature and stripping the sulfonated blend with sufficient chemically unreactive gas to remove a major fraction of the acid functionality introduced by sulfonation. The invention also provides for the compositions made by the process. These are useful as binders in road paving applications.

20 Claims, 1 Drawing Sheet

PAVEMENT BINDER

FIELD OF THE INVENTION

The present invention relates to asphaltic pavement binders.

BACKGROUND OF THE INVENTION

Asphalt is a viscoelastic semi-solid bituminous material derived from the distillation residue of crude petroleum. Typically, asphalt has an atmospheric equivalent boiling point of at least 350° C., and more generally above 500° C. Because it has good adhesive and weathering characteristics, it is widely used as a binder or cement for stone aggregate in pavement construction. The asphalt cement typically comprises only about 5% of the mixture of asphalt and aggregate. If, because of the nature of the crude oil distilled, the asphalt is too soft at ambient temperature, a harder product may be manufactured, for example, by extraction of the lighter components with liquid propane or other solvents, or by oxidizing by air blowing at an elevated temperature, such as 275° C. Both of these well established manufacturing processes can give asphalts that are too brittle at low temperature, and result in excessive cracking in cold weather.

Another means of stiffening soft asphalt to extend its useful temperature range is by blending with suitable polymers. Polymers can reduce the tendency of the asphalt pavement to creep and rut in warm weather by increasing its high temperature viscoelastic stiffness; and polymers can permit the use of softer grades of asphalt to minimize cracking in cold weather without risking excessive softening in hot weather. Unfortunately, many such asphalt-polymer blends are not storage stable.

When it is used as a pavement binder, asphalt is normally mixed with aggregate at a temperature where the asphalt is sufficiently fluid to coat the aggregate particles, typically 150° C. Asphalt is commonly stored, loaded, transported by truck or rail and pumped at the hot mix plant at similarly high temperatures so that it can be pumped and handled as a fluid. It is not always practical to keep an asphalt-polymer blend continuously homogenized before mixing the blend with the rock aggregate; consequently, storage stability is desirable to keep the blend from separating under storage conditions.

However, not all asphalts and polymers form compatible mixtures. The storage stability of polymer modified asphalt is greatly affected by the compatibility of the asphalt with the particular polymer. At normal handling and storage temperatures, the mixture typically forms two liquid phases, with most of the polymer and the lighter, less polar asphalt components in one phase, and most of the heavier, more polar asphalt components in a second phase.

Various methods have been suggested for making polymer-modified asphaltic compositions that are sufficiently compatible to be acceptably storage stable and that also have the viscoelastic properties in the ranges required for a particular application. U.S. Pat. No. 5,348,994 (Gorbaty) teaches the preparation of storage stable hot mix pavement binder having improved viscoelastic properties inter alia by cosulfonation followed by neutralization of a blend of asphalt and polymer having some unsaturated bonds. Gorbaty introduced sulfonate groups to the polymer and asphalt, and added neutralizing agent to the sulfonated polymer and sulfonated asphalt to form a storage stable blend. The neutralizing agent in Gorbaty could include amines, but in all instances it was a required additional component of the blend.

DETAILED DESCRIPTION OF THE DRAWINGS

Figure 1:
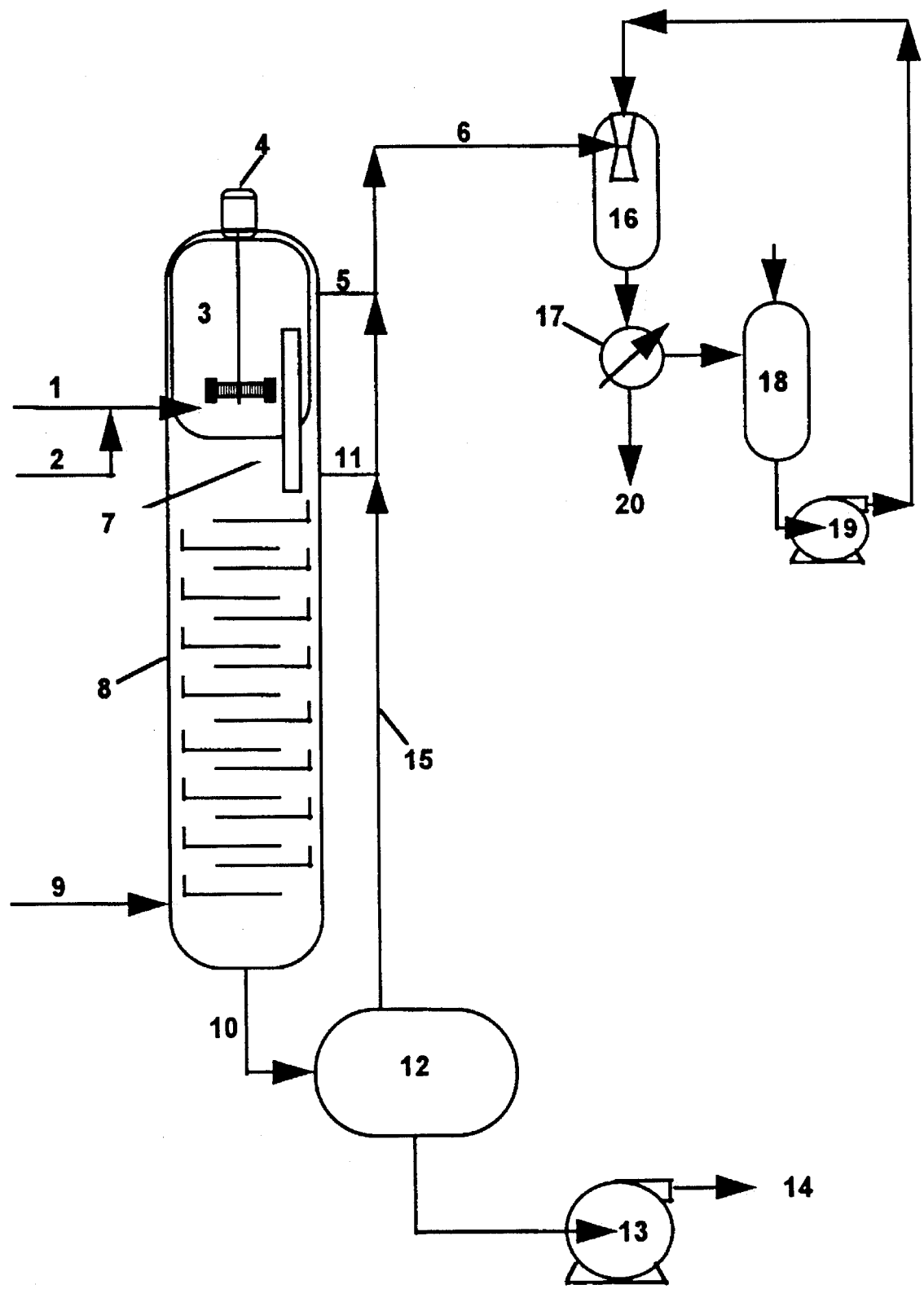

FIG. 1 shows a method for making polymer a modified asphalt according to the process of the present invention.

SUMMARY OF THE INVENTION

The present invention provides for a method of making storage stable road paving binder compositions, by blending a minor amount of a polymer having at least one diene monomer with a major amount of an asphalt containing at least 0.3% by weight of total nitrogen (typically 30 to 50% basic organic nitrogen) at an elevated temperature such that the components are sufficiently fluid to blend; treating the asphalt-polymer blend using not more than 250 meq of a sulfonating agent per 100 g of asphalt-polymer blend to introduce the corresponding acid functionality into the blend; and maintaining the sulfonated asphalt-polymer blend at a sufficiently elevated temperature and stripping the sulfonated blend with a sufficient amount of chemically unreactive gas to remove a major fraction of the acid functionality introduced by sulfonation.

The present invention provides for a storage stable road paving binder compositions produced by the process of blending a minor amount of a polymer having at least one diene monomer with a major amount of asphalt containing at least 0.3 by weight of total nitrogen (typically 30 to 40% basic organic nitrogen) at an elevated temperature such that the components are sufficiently fluid to blend; treating the asphalt-polymer blend using not more than 250 meq of a sulfonating agent per 100 g of asphalt-polymer blend to introduce the corresponding acid functionality into the blend; and maintaining the sulfonated asphalt-polymer blend at a sufficiently elevated temperature and stripping the sulfonated blend with a sufficient amount of chemically unreactive gas to remove a major fraction of the acid functionality introduced by sulfonation.

The present invention may suitably comprise, consist of, or consist essentially of the elements disclosed. The present invention includes the method of making the disclosed compositions, the compositions, and the products produced by the processes disclosed herein.

DETAILED DESCRIPTION OF THE INVENTION

The present invention has utility in road paving applications by providing pavement binders having enhanced viscoelastic properties and improved manufacturing methods for making such binders.

One embodiment of the present invention is a process for making road paving binder compositions that exhibit improved viscoelastic properties and compatibility between asphalt and polymer, such compatibility being manifested by enhanced storage stability. These compositions demonstrate a substantially uniform distribution of asphalt and polymer phases in the blend, which distribution does not segregate on standing at elevated temperatures. Hence, the invention demonstrates a means for bringing about and maintaining compatibility between incompatible polymers and asphalts. Thus, in the present invention, it is essential that the polymer and asphalt phases in the binder composition do not phase segregate significantly into an asphalt phase and a polymer phase, but rather remain substantially uniformly interspersed in the blend on standing at the elevated temperatures at which paving binder compositions are typically produced and used or at which storage stability is typically measured.

The phase behavior of asphalt-polymer blends is complex but can be observed by optical microscopy of a thin layer of the blend pressed between two microscope slides. An asphalt-polymer blend may consist of one or two phases. One phase systems result when polymer is dissolved in asphalt. However, most asphalt-polymer blends form systems of two separate phases; one phase, often called the polymer phase contains most of the polymer, while the other phase is mostly or entirely asphalt. Typically, one or the other phase is continuous. In one such case, discrete polymer-phase particles are dispersed in asphalt; in another, asphalt may be dispersed in the polymer phase; in yet a third case, both polymer and asphalt phases are continuous.

Storage stability means that the phases do not phase segregate on standing for a specified period of time, usually 3–5 days, at a specified elevated temperature, usually 160° C. Phase separation of the asphalt and the polymer, to the extent that it occurs, should not result in substantial physical segregation of the asphalt and polymer in the blend.

In the blends of the present invention, it is required that the asphalt and polymer remain interspersed throughout the blend during hot storage, as measured by the physical properties such as softening point, viscosity, or penetration of samples taken of the top third and bottom third or top half and bottom half of a sample of the blend at elevated temperatures. Generally, in a system or blend that is phase segregated, the system tends to form layers, such that the phase into which the polymer segregates shows a significantly higher softening point, higher viscosity, and lower penetration than that of the asphalt phase, which is substantially depleted of polymer. The storage stable asphalt-polymer blends of the present invention will not phase segregate. Rather, the asphalt, polymer and basic nitrogen neutralizing agent are present in amounts that are effective, after removal of excess $SO_2$, to allow the formation of one continuous phase or two interspersed phases that do not segregate on standing at elevated temperatures.

Small differences of softening points between the top and the bottom fraction of the sample of the blend do not always adequately define storage stability. Thus, a narrow temperature difference may exist and yet phase segregation may be present. For example, the top portion of the blend can have a continuous polymer phase with asphalt dispersed therein while the bottom portion has a continuous asphalt phase with polymer dispersed therein, even though the softening points are within the required range. On the contrary, by the practice of this invention, the continuous phase at any point in the blend is always the same. That is, for true storage stability the top portion of the blend will have the same continuous phase as the bottom portion. Phase compatibility is observed by optical microscopy and occurs if asphalt is continuous top and bottom with polymer dispersed therein; or polymer is continuous top and bottom with asphalt dispersed therein; or both polymer and asphalt are continuous top and bottom with asphalt and polymer each dispersed in the other; and also wherein the physical properties of the top and bottom fractions of the sample are essentially the same. Any two of the following independent physical property inspections of the top and bottom fractions of a sample removed from hot storage can be used to determine storage stability; the same phase is continuous as observed by optical microscopy; softening point by ring and ball test (ASTM D36) do not differ by more than 4° C.; the ratio of penetrations at 25° C. (ASTM D5) is between 0.9 and 1.1; and the ratio of kinematic viscosities at 135° C. (ASTM D2170) is between 0.9 and 1.1.

By way of summary, in the present invention a major amount of an asphalt containing at least 0.3% by weight of nitrogen, or typically 30 to 40%, i.e. at least 5 meq basic nitrogen per 100 g of asphalt is blended with a minor amount, preferably less than 7%, more preferably less than 5% by weight of a suitable polymer or copolymer of at least one diene monomer, at a sufficiently elevated temperature and with sufficient blending conditions to thoroughly disperse the polymer in the asphalt. The blend is sulfonated by adding to the blend a minor amount, not more than 250 meq, preferably less than 30, more preferably 20 to 30 meq $SO_3$ per 100 g of asphalt-polymer blend, of a sulfonating agent. The sulfonated blend is stripped with a chemically unreactive gas, for example by bubbling the steam or chemically unreactive gas through the liquid blend or intimately contacting the liquid and gas in a suitable counter-current staged stripping vessel at a sufficiently high temperature and with sufficient stripping gas volume to remove a major fraction, preferably at least 70% of the acid functionality introduced by sulfonating the blend, as $SO_2$. After stripping there typically remains less than 10 meq sulfonated function per 100 g of asphalt-polymer blend, or not more than the equivalent basic nitrogen in the starting asphalt.

The polymer modified asphalt product produced by the steps disclosed herein is a storage stable binder with increased high temperature stiffness, with low temperature stiffness equal to or less than that of the starting asphalt, and with typically less than 0.1% inorganic residue insoluble in trichloroethylene and an essential absence of sulfate groups.

The enhanced viscoelastic properties are observed as an increase in the softening point, and an increase in the viscosity at 135° C., both measures of increased stiffening at elevated temperatures, with a negligible decrease in the penetration at 4° C., measured with 200 g for 60 seconds, which is a measure of increased low temperature brittleness. Another measure of low temperature performance is the limiting stiffness temperature, or the temperature where the creep stiffness is 300 MPa at 60 seconds loading time as measured by a bending beam rheometer. Generally a pavement binder can be used in pavements at temperatures as low as 10° C. below the limiting stiffness temperature without cracking due to thermal contraction.

The achievement of a storage stable polymer modified asphalt product having the viscoelastic properties described herein without added neutralizing agent is unexpected. Asphalt is a complex mixture of hydrocarbons, most of which are aromatic, and some of which contain acid substituents, basic substituents, or both. Such acidic and basic functionalities are evident only inasmuch as they react with strong bases or acids, respectively, in tests designed to measure organic acids and bases in petroleum products. The organic bases are aminic and contain typically 30 to 40% of the total nitrogen in the asphalt. In most asphalts there are essentially no olefinic structures, but olefin functionalities are common in polymers or copolymers made from at least one diene monomer, such as butadiene. The expected reaction of a strong sulfonating agent such as sulfuric acid would be first to neutralize amines forming quaternary ammonium sulfates, then to sulfonate olefinic bonds in the polymer, and finally to sulfonate aromatic rings. It would be expected that the quaternary ammonium sulfates would have no effect on storage stability, and that additional common neutralizing agent would need to be added to bind sulfonated asphalt to sulfonated polymer.

Applicants have discovered, however, that if the sulfonated asphalt polymer blend is maintained at an elevated temperature without further added neutralization, preferably between 180° and 220° C., more preferably 180° to 200° C., most preferably 190° to 200° C., sulfonic acid groups decompose to yield $SO_2$, which must be stripped from the product to avoid environmentally offensive emissions. The yield of $SO_2$ is typically equivalent to 70 to 80% of the sulfonating agent treat. The remaining 20 to 30% (mole %) is present as sulfonic acid groups, and there is unexpectedly negligible sulfate. Consequently, Applicants believe that the naturally occurring amines in the asphalt, if present in adequate concentration, would serve as a common neutralizing agent to bind the remaining sulfonic acid groups in the asphalt and polymer. The resulting storage stable binder is essentially free of $SO_2$ and has the required viscoelastic properties described previously.

The materials used herein are available from commercial sources. Typically, the starting asphalt will have a nominal atmospheric boiling point of at least 350° C. and more typically above 440° C. The asphalts should have a penetration grade of from about 100 to 600 dmm at 25° C., preferably 200 to 400, most preferably 300 to 400 dmm as measured by ASTM Standard Test Procedure D5 at 25° C., using 100 g for 5 seconds. The asphalts used in the present invention must contain at least 0.3% total nitrogen, and may be obtained from a variety of sources of vacuum residue and may be classified by their penetration grade according to ASTM Standard Specification D-946 or by viscosity grade according to ASTM Standard Specification D-3381. The nitrogen content is not included in standard specifications, but may readily be determined by one skilled in the art as part of a normal crude petroleum assay, e.g. from crude petroleum assays for the crude oils fed to the vacuum pipestill used to manufacture the asphalt. Some asphalts contain more than 2.4% by weight of organic nitrogen, of which as much as 40% is basic (amine) nitrogen, and could therefore neutralize more than 50 meq acid per 100 g. Such asphalts may allow treat rates of as much as 250 meq per 100 g of asphalt-polymer blend without requiting additional neutralization, since as much as 80% of the acid function introduced by the sulfonating agent can be removed by stripping with chemically unreactive gas at elevated temperature.

The polymer used in the blend must contain a diene monomer. Typically these include block copolymers of styrene and butadiene (SB or SBS), random copolymers of styrene and butadiene (styrene-butadiene rubber or SBR), copolymers of ethylene, propylene, and at least one diene monomer (EPDM), butyl rubbers, or any other suitable polymer having some unsaturated bonds and which is more elastic at ambient and summer pavement temperatures than asphalt without imparting low temperature brittleness. The weight percent of polymer in the total polymer modified asphalt binder should be an effective amount based on the desired physical properties of the resulting road paving asphaltic binder composition and may be any suitable amount greater than zero sufficient to achieve the foregoing physical properties. However, for EPDM, SBR and butyl rubbers the amount is greater than zero wt. %, preferably from about 1 to about 4 wt. %, more preferably 2–3 wt. % and for styrene-butadiene block copolymers, greater than zero to about 7 wt. %, preferably from about 1–5 wt. %. The upper limit is often constrained by the cost of the polymer added, as well as by physical properties of the product. For most polymers, the preferred blend consists of 1% to 3% by weight of polymer. Blends containing more than 5% polymer are very costly and difficult to mix and compact in pavement construction because such blends are very viscous even at the elevated temperatures used by hot mix plants.

The major amount of asphalt and minor amount of polymer are blended prior to sulfonation at elevated temperature, typically 140° C. to 200° C., with a high shear blending apparatus which can distribute the polymer uniformly throughout the blend. It is further desirable to maintain the elevated temperature for at least 30 minutes to as much as 4 hours depending on the form of the polymer, with constant agitation to achieve phase equilibrium between the dispersed polymer phase and the continuous asphalt phase, before beginning the sulfonation step.

In the present invention, the asphalt-polymer blend is functionalized to contain sulfonic acid or sulfonate groups. Sulfonation may be performed by means known to one skilled in the art. Sulfuric acid, oleum, or acyl sulfates are suitable sulfonating agents. It is preferred that sulfuric acid or oleum be used as the sulfonating agent by adding it slowly to the asphalt-polymer blend.

The sulfonation can be carried out at temperatures as low as 120° C., but the asphalt-polymer blend is much less viscous at temperatures above 140° C., and higher temperatures are preferred to ensure adequate mixing of the sulfuric acid. Stripping must be carried out at a more elevated temperature, at least 180° C. with an upper limit of 220° C., preferably from 190° C. to 200° C. The volume of stripping gas required to remove the formed $SO_2$ depends on the temperature, the interfacial area between the gas and liquid phases, the efficiency of contacting, and the amount of back-mixing in the liquid phase, but is at least equivalent, preferably at least 5 times and may be as much as 20 times the volume of the asphalt-polymer blend. Any chemically unreactive gas may be used for stripping. Suitable gases include steam, nitrogen carbon dioxide, combusted flue gas, and true inert gases such as argon or helium.

It is possible to adjust the softening point and viscosity of the road paving asphaltic composition by varying the amount of sulfonation of the asphalt-polymer blend and/or amount of polymer in the composition. In general, both polymer addition and sulfonation increase the high temperature stiffness and viscosity of the blend with little effect on the low temperature properties. Thus, the low temperature properties are determined primarily by selection of the appropriate grade of starting asphalt, and the high temperature properties by the level of addition of polymer and sulfonating agent. The physical properties of the resulting composition will vary accordingly. In addition, if necessary, in order to bring the viscosity of the mixture into the range acceptable for the particular application, additional untreated asphalt may be added as a flux to the sulfonated asphaltic composition. The amount of flux to be added will depend on the viscosity of the starting materials and the desired viscosity of the end product and the particular application and is readily determinable by one routinely skilled in the art in view of the teachings herein. Another embodiment of the present invention is novel asphaltic paving compositions which include the asphaltic binder compositions produced by the process described above.

The storage stable binder compositions having the aforementioned features and made by the methods disclosed herein are also included in the invention.

It has been found that, as compared with asphalt alone and unsulfonated polymer-modified asphalts, the polymer modified asphalt binders herein have viscoelastic properties, softening point, phase compatibility and, thus, storage stability such that the asphalt and polymer phases are substantially uniformly dispersed in each other and do not phase segregate on standing for long periods at elevated temperatures as discussed herein. Thus, the asphalt and polymer phases present in the composition are effectively distributed in a uniform or substantially uniform manner as evidenced by optical micrographs. Substantially uniform means a distribution that effectively maintains asphalt and polymer phases without significant segregation and results in phase stability. A disadvantage of blends which are not storage stable at elevated temperatures is that the polymer and asphalt phase segregate and become unusable, particularly after standing at elevated temperatures for long periods.

The binders may be combined with aggregate or rock to form superior paving compositions having improved properties. Of particular note, in addition to the superior characteristics associated with the binder composition, is the improvement in adhesion of the binder to the aggregate of the paving composition. To form the paving compositions, the novel binders may be combined with aggregate or rock in effective amounts by any suitable means known to one skilled in the art. Aggregate is known to those skilled in the art and suitably is any particulate material used in road paving applications for combination with binder. Any suitable material, typically, locally available materials may be used; e.g., rock, stone granite, shells or other suitable high modulus material. The novel binder compositions of the present invention may be used to form paving compositions containing aggregate or rock and the novel binders disclosed herein by forming the binder according to the methods disclosed above having the required characteristics of phase compatibility and, thus, storage stability, as well as superior viscoelastic properties described above, and mixing the binder with aggregate or rock to form the road paving composition, which paving material may be applied to a paving surface according to methods and under conditions known to those skilled in the art to be effective to produce a road paving surface.

Inorganic trichloroethylene-insoluble additives are sometimes added to asphaltic pavement binders, in which case there may be more than the typical level of less than 0.1% resulting from the practice of this invention, but such additives are not necessary for the practice of this invention nor do they circumvent the claims herein.

The invention is illustrated by the following examples, which are not intended to limit the scope of the invention.

EXAMPLE 1

A sample of 2300 g of Cold Lake 300/400 penetration grade asphalt having a total nitrogen content of 0.56% by weight was charged to a 4 liter reaction vessel equipped with a 6 bladed vertical shaft turbine mixer, an acid addition tube, and a polymer addition tube. A purge of nitrogen was established through the acid addition tube at a rate of 300 ml/min before asphalt was added to the vessel, and maintained at that rate throughout the experiment. The asphalt was heated to 140° C. The polymer, a radial triblock SBS (Vector 2411 PD) was added (47 g; 2 wt % based on asphalt-polymer blend) at 140° C. with stirring at 1000 rpm. The mix was blended for 1 hour, and was recirculated through a heated line containing a static mixer. After 1 hour, concentrated (98%) sulfuric acid was added (25 meq per 100 g of asphalt-polymer blend) at a rate of approximately 0.5 ml/min over a period of 45 minutes. Directly after acid addition the vessel was heated from 140° C. to 190° C. with stirring continued at 1000 rpm. Heating time was 25 minutes. Stirring and sparging were continued for an additional 260 minutes, for a total time of 330 minutes from beginning of acid addition to draining the vessel. No additional neutralizing agent was used. The titration curve of samples taken from the NaOH scrubber show that no $SO_2$ was trapped during the first 45 minutes; some was trapped between 45 and 70 minutes; more than 85% of the total $SO_2$ was trapped after 120 minutes and no more was trapped after 150 minutes. After 4 days storage at 160° C. the top had a softening point of 61.1° C.; the bottom 61.7° C., and the stored sample was found stable by optical microscopy. The softening point of the starting asphalt was 35° C. The limiting stiffness temperature of the starting asphalt as measured by a low temperature bending beam rheometer was −26.5° C., and the limiting stiffness temperature of the sulfonated asphalt-polymer blend was −28° C. Consequently, it was observed that practice of the present invention improved the high temperature stiffness as measured by ring and ball softening point, without inducing low temperature embrittlement, and without sacrificing storage stability.

EXAMPLE 2

Approximately 500 g of Cold Lake 300/400 penetration grade asphalt was loaded into a 1-liter lab blender equipped with a 6-blade turbine stirrer. Blending temperature was set to 195° C. Styrene-butadiene-styrene radial copolymer (Vector 2411PD) was added gradually to give 3 wt % polymer in the blend. After asphalt and polymer had been blended for 1 hour, the blend was treated with sulfuric acid added using a syringe pump at approximately 1 cc/min until the desired treat level was achieved. The experiment was repeated to give various treat levels of sulfuric acid ranging from 0 to 30 meq/100 g of asphalt-polymer blend. The reaction vessel was heated to maintain a temperature of 195° C. for 60 minutes with continued stirring to drive out $SO_2$. In this series of experiments, the decomposition of organic sulfonates following the sulfonation step was induced by heating at 195° C. without sparging or stripping. It was subsequently found that $SO_2$ was not adequately removed, and was evolved during mixing with hot aggregate resulting in odor emission characteristic of $SO_2$.

At the end of the run the product was analyzed according to ASTM asphalt testing procedures. For storage stability determination, a copper tube (3 cm diameter, 24 cm long) was filled with fresh blend and stored at 160° C. for 5 days. The tube was then taken out of the oven and allowed to cool to room temperature and then cut into two sections. The top and bottom sections were analyzed for penetration at 25° C. (Pen) and viscosity at 135° C. (Vis). The viscosity increase of cosulfonated asphalt-polymer mixture varied with the level of sulfuric acid treatment as shown in Table 1 which gives measured product properties of cosulfonated asphalt-SBS binders (at different levels of sulfuric acid treat) as compared to using calcium oxide as neutralizing agent (column 7) and also to conventional 85/100 grade asphalt (column 8). Significant improvement in high temperature properties is shown by much higher absolute viscosity at 60° C. values and higher softening point for cosulfonated binders as compared to conventional 85/100 asphalt.

TABLE 1

| Column 1 Property | 3% SBS + 0 meq H2SO4 | 3% SBS + 10 meq H2SO4 | 3% SBS + 20 meq H2SO4 | 3% SBS + 25 meq H2SO4 | 3% SBS + 30 meq H2SO4 | 3% SBS + 18 meq H2SO4 + 0.6% CaO | Column 8 85/100 Pen 0% SBS + 0 meq H2SO4 |
|---|---|---|---|---|---|---|---|
| Pen at 25° C., dmm | 165 | 114 | 48 | 77 | 62 | 87 | 87 |
| Vis 135° C., cSt | 545 | 839 | 1401 | 1606 | 2581 | 1198 | 382 |
| Vis 60° C., Pa.s. | 146 | 530 | 2796 | 6654 | 1251 | 1983 | 188 |
| Softening Point, °C. | 41 | 54 | 62 | 65 | 71 | 59 | 44 |
| Inorganic residue, g/100 g | none | none | none | none | none | 0.71 | none |

Table 2 shows storage stability of cosulfonated asphalt-SBS binders as compared to using calcium oxide as a neutralizing agent. In the absence of sulfuric acid treatment the viscosity is lower and the product is not storage stable (polymer phase separates from the asphaltene phase, as illustrated in column 2). It is evident from Tables 1 and 2 that storage stability of the cosulfonated binders is comparable to CaO neutralized binder with no inorganic residue in the finished product.

TABLE 2

| Column 1 Storage stability 5d @ 160° C. | 3% SBS + 0 meq H2SO4 | 3% SBS + 10 meq H2SO4 | 3% SBS + 20 meq H2SO4 | 3% SBS + 25 meq H2SO4 | 3% SBS + 30 meq H2SO4 | Column 7 3% SBS + 18 Meq H2SO4 + 0.6% CaO |
|---|---|---|---|---|---|---|
| Pen Top | 142 | 109 | 80 | 75 | 63 | 86 |
| Pen Bttm | 146 | 107 | 78 | 75 | 63 | 85 |
| Pen T/B | 0.97 | 1.02 | 1.02 | 1.0 | 1.0 | 1.01 |
| Vis Top | 1207 | 1067 | 1591 | 1940 | 3530 | 1269 |
| Vis Bttm | 352 | 1019 | 1509 | 1903 | 3661 | 1314 |
| Vis T/B | 3.42 | 1.03 | 1.05 | 1.02 | 0.96 | 0.97 |
| Storage Stable? | No | Yes | Yes | Yes | Yes | Yes |

EXAMPLE 3

A suggested design of a suitable process for manufacturing up to 600 tons per day of pavement binder according to the present invention is shown in FIG. 1.

The process described herein with reference to FIG. 1 is meant to illustrate a suitable sequence of processing steps for practice of the invention, and is not intended to limit the variations which are obvious to one skilled in the art, but are nevertheless encompassed within the claims.

With reference to FIG. 1, a preferred configuration of processing equipment for the sulfonation reactions and subsequent stripping of acid gas is illustrated wherein up to 600 tons per day of asphalt-polymer blend may be treated. The asphalt-polymer blend is made by adding 2% by weight of SBS polymer to residuum of crude oil distillation having a penetration grade between 300 and 400 dmm at 25° C., having a ring and ball softening point of approximately 35° C., and having a total nitrogen content of approximately 0.6% by weight. The asphalt-polymer blend is prepared by blending in a high shear mill and is maintained in a feed tank at 190° C. in conventional facilities not shown, but familiar to those skilled in the art.

The asphalt-polymer blend is fed through line 1 at a rate of 140 gallons per minute where it is mixed with concentrated (98%) sulfuric acid fed through line 2 at a rate of 1.3 gallons per minute from a sulfuric acid feed tank, not shown, maintained at ambient temperature, such as 25° C. The relative proportions of these two streams are equivalent to an acid treat rate of 25 meq sulfuric acid per 100 g of asphalt-polymer blend. The mixture is introduced to a reaction vessel 3, the sulfonator, which is equipped with a means of agitation such as the vertical shaft turbine mixer 4 to thoroughly distribute the reactants until the sulfonation reaction is complete. The sulfonation reaction is exothermic, and subsequent decomposition of up to 80% of the sulfonated components yielding $SO_2$ is endothermic, resulting in an overall reaction that is still slightly exothermic. As a result a means of temperature control is provided to the sulfonator 3 to maintain the temperature between 190° C. and 200° C. Some $SO_2$ and steam will be evolved from the sulfonator and are conveyed by means of the vent pipe 5 to the intake manifold 6 of the caustic scrubber 16.

The sulfonated asphalt-polymer blend is continuously withdrawn from the sulfonator to maintain level control within the sulfonator, and may be conveyed by any suitable means such as the overflow downcomer 7 to a stripper 8 wherein the blend is intimately contacted, preferably in counter-current equilibrium stages with superheated low pressure steam or other chemically unreactive gas introduced into the bottom of the stripper through line 9. The steam provides heat for additional endothermic decomposition of sulfonated asphalt-polymer blend yielding additional $SO_2$ which is carried from the stripper through vent line 11 to the scrubber intake manifold 6. The stripped asphalt-polymer blend, substantially free of gaseous components and entrained sulfuric acid is withdrawn through line 10 to the product rundown tank 12 where disengagement of entrained stripping steam occurs and is vented through line 15 to a scrubber intake manifold 6. Off gas scrubbing is a desirable feature in the present invention and is described herein for completeness.

The scrubber intake manifold 6 is maintained at a slight vacuum to withdraw steam and gaseous components through vent lines 5, 11, and 15 to the scrubber. The vacuum is maintained by the condensing of steam by means of cooling with caustic scrubber water injected into the throat of the venturi of scrubber 16. The cool caustic scrubber water condenses steam and neutralizes acidic gases such as $SO_2$ to form their dissolved sodium salts such as sodium sulfite. The solution of neutralized acid salts, having been heated by condensing steam is withdrawn to a heat exchanger 17 where it is cooled by industrial cooling water, and conveyed to further waste water treating facilities 20 not shown, but familiar to those skilled in the art. The pH of the effluent water sent to waste water treating may be monitored to be maintained neutral to slightly alkaline as controlled by the rate of addition of makeup caustic, typically a concentrated solution of sodium hydroxide (NaOH) to the caustic feed tank 18. The rate of cooling water to heat exchanger 17 and the rate of caustic solution circulation through scrubber pump 19 may be used to control the level of vacuum in intake manifold 6 by regulating the rate and temperature of condensing scrubber water fed to scrubber 16, and thereby the rate of steam condensation occurring in the scrubber.

The finished product in rundown tank 12 may be conveyed by means of pump 13 to a suitable storage tank 14 not shown, at a rate necessary to maintain level control in rundown tank 12. At the rates described herein, a batch of 600 tons of finished product can be prepared in approximately 20 hours, allowing an additional 4 hours for testing and certification, for an overall rate of 600 tons per day.

Many variations of the basic concepts disclosed herein will be obvious to one skilled in the art. In one variation, for example, if enough feed and product tankage is available, the sulfonation and stripping unit may be run continuously for a capacity of approximately 720 tons per day. In another variation, for example, the asphalt-polymer blend may be fed at a selected temperature between 120° C. and 190° C. allowing the exothermic sulfonation reaction and superheated steam fed to the stripper to raise the temperature in the stripper to 190° C. to 200° C. In still other variations, for example, the geometric configurations of both the reactor and the stripper may be changed to utilize existing equipment, adapt to space limitations, improve contacting efficiency or flow control. These and many other variations are included within the scope of the disclosure and are encompassed within the claims.

What is claimed is:

1. A method of making a road paving binder composition, which comprises:

a. blending a minor amount of a polymer having at least one diene monomer with a major amount of asphalt containing at least 0.3% by weight of total nitrogen at an elevated temperature sufficient to permit blending;

b. treating the asphalt-polymer blend with not more than 250 meq of a sulfonating agent per 100 g of asphalt-polymer blend to introduce the corresponding acid functionality into the blend;

c. maintaining the sulfonated asphalt-polymer blend at a sufficiently elevated temperature and stripping the sulfonated blend with sufficient chemically unreactive gas, to remove a major fraction of the acid functionality introduced by sulfonation.

2. The method of claim 1 wherein the polymer is a copolymer of styrene and butadiene.

3. The method of claim 1 wherein the polymer is a block copolymer of styrene and butadiene.

4. The method of claim 1 wherein the the polymer is styrene-butadiene-styrene triblock copolymer.

5. The method of claim 1 wherein the minor amount of polymer is between 0.1% and 7% by weight of the asphalt-polymer blend.

6. The method of claim 1 wherein the amount of polymer is between 1% and 3% by weight of asphalt-polymer blend.

7. The method of claim 1 wherein the penetration test of the starting asphalt results in a value between 100 and 600 dram as measured by ASTM Standard Test Method D5 at 25° C. using 100 g for 5 seconds.

8. The method of claim 1 wherein the penetration test result of the starting asphalt is between 200 and 400 dmm.

9. The method of claim 1 wherein the sulfonating agent is concentrated sulfuric acid.

10. The method of claim 1 wherein the treating of step (b) is carried out at a temperature between 120° C. and 220° C.

11. The method of claim 1 wherein the treating of step (b) is carried out at a temperature of at least 140° C.

12. The method of claim 1 wherein the amount of sulfonating agent is from 10 and 50 meq/100 g of asphalt-polymer blend.

13. The method of claim 1 wherein the amount of sulfonating agent from 15 to 35 meq/100 g of asphalt polymer blend.

14. The method of claim 1 wherein the sulfonated asphalt-polymer blend is maintained in step (c) at a temperature of between 180° C. and 220° C.

15. The method of claim 1 wherein the sulfonated asphalt-polymer blend is maintained in step (c) at a temperature of between 190° C. and 200° C.

16. The method of claim 1 wherein said chemically unreactive gas comprises steam, nitrogen, carbon dioxide, combusted flue gas, helium, argon, or mixtures thereof.

17. The method of claim 1 wherein the sulfonated asphalt polymer blend is stripped with at least an equivalent volume of said chemically unreactive gas.

18. The method of claim 1 wherein the sulfonated asphalt-polymer blend is stripped with at least 5 times by volume and not more than 20 times by volume of said chemically unreactive gas.

19. The method of claim 1 wherein the asphalt has a penetration grade of 300 to 400 dmm, the polymer is from 2 to 3 wt % styrene-butadiene-styrene radial triblock, the sulfonating agent is from 20 to 30 meq of concentrated sulfuric acid/100 g blend and stripping is carried out at from about 190° C. to 200° C.

20. A storage stable road paving binder composition produced by the process of:

a. blending a minor amount of a polymer having at least one diene monomer with a major amount of asphalt containing at least 0.3 by weight of total nitrogen at an elevated temperature sufficient to permit blending;

b. treating the asphalt-polymer blend with not more than 250 meq of a sulfonating agent per 100 g of asphalt-polymer blend to introduce the corresponding acid functionality into the blend; and c. maintaining the sulfonated asphalt-polymer blend at a sufficiently elevated temperature and stripping the sulfonated blend with sufficient chemically unreactive gas, to remove a major fraction of the acid functionality introduced by sulfonation.

* * * * *